(12) United States Patent
Bahrami et al.

(10) Patent No.: US 11,703,145 B1
(45) Date of Patent: *Jul. 18, 2023

(54) FLUID DAMPED CHECK VALVE, AND ASSOCIATED SYSTEMS AND METHODS

(71) Applicant: Blue Origin, LLC, Kent, WA (US)

(72) Inventors: Justin K. Bahrami, Bellevue, WA (US); Kyle J. Meeuwsen, Puyallup, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,335

(22) Filed: Nov. 1, 2021

Related U.S. Application Data

(63) Continuation of application No. 16/813,388, filed on Mar. 9, 2020, now Pat. No. 11,174,966.

(51) Int. Cl.
*F16K 47/04* (2006.01)
*F16K 15/02* (2006.01)
(Continued)

(52) U.S. Cl.
CPC ............ *F16K 47/04* (2013.01); *F16K 15/025* (2013.01); *F16K 1/12* (2013.01); *F16K 15/063* (2013.01);
(Continued)

(58) Field of Classification Search
CPC .... F16K 15/063; F16K 47/04; Y10T 137/785; Y10T 137/7852; Y10T 137/7853; Y10T 137/7932
See application file for complete search history.

(56) References Cited

U.S. PATENT DOCUMENTS

| 18,058 A | 8/1857 | Raymond |
| 965,052 A * | 7/1910 | Wainwright ........ F16K 17/0433 |
| | | 137/454.2 |

(Continued)

FOREIGN PATENT DOCUMENTS

| DE | 10058339 A1 | 6/2002 |
| EP | 0741655 | 11/1996 |

(Continued)

OTHER PUBLICATIONS

U.S. Appl. No. 16/788,260, filed Feb. 11, 2020, Perry.

(Continued)

*Primary Examiner* — Robert K Arundale
(74) *Attorney, Agent, or Firm* — Perkins Coie LLP

(57) ABSTRACT

Fluid damped check valves are described herein. A representative check valve includes a piston assembly movably positioned within a housing. The housing can include a flow chamber, a damping chamber containing a damping fluid, and a leak chamber fluidly coupled between the flow chamber and the damping chamber. The piston assembly can include a poppet positioned in the flow chamber, and a flange positioned in the damping chamber. In operation, the piston assembly is movable between (i) a closed position in which the poppet sealingly engages the housing to at least inhibit fluid flow through the flow chamber and (ii) an open position in which the poppet disengages from the housing and permits fluid flow through the flow chamber. When the piston assembly moves between the open and closed positions, the flange moves through the damping fluid in the damping chamber to slow the movement of the poppet.

20 Claims, 6 Drawing Sheets

(51) Int. Cl.
  *F16K 1/12* (2006.01)
  *F16K 15/06* (2006.01)
(52) U.S. Cl.
  CPC ...... *Y10T 137/785* (2015.04); *Y10T 137/7852* (2015.04)

(56) References Cited

U.S. PATENT DOCUMENTS

| | | |
|---|---|---|
| 1,595,300 A | 8/1926 | Halloran |
| 2,037,663 A | 4/1936 | Lalor |
| 2,043,337 A | 6/1936 | Smith |
| 2,243,711 A * | 5/1941 | Lamb ................. F16K 17/02 137/538 |
| 2,307,273 A | 6/1943 | Hughes |
| 2,954,047 A | 9/1960 | Syrucek |
| 3,140,584 A | 7/1964 | Ritchey |
| 3,159,179 A | 12/1964 | De Lain |
| 3,285,520 A | 11/1966 | Johnson |
| 3,329,396 A | 7/1967 | Heaton et al. |
| 3,438,316 A | 4/1969 | Rodier |
| 3,451,625 A | 6/1969 | Fruktaw |
| 3,787,022 A | 1/1974 | Wilcox et al. |
| 3,828,551 A | 8/1974 | Schmidt |
| 2,870,599 A | 10/1975 | Bolner |
| 3,912,172 A | 10/1975 | Bolner |
| 4,057,072 A * | 11/1977 | Cook ................. F16K 17/0433 137/115.18 |
| 4,091,838 A | 5/1978 | Dowty |
| 4,094,492 A | 6/1978 | Beeman et al. |
| 4,104,877 A | 8/1978 | Bone et al. |
| 4,184,238 A | 1/1980 | Carey |
| 4,350,179 A | 9/1982 | Bunn |
| 4,398,558 A | 8/1983 | Cadeddu |
| 4,513,948 A | 4/1985 | Konig |
| 4,796,839 A | 1/1989 | Davis |
| 4,811,182 A | 3/1989 | Solomon |
| 4,964,340 A | 10/1990 | Daniels et al. |
| 4,970,857 A | 11/1990 | Faupell |
| 5,033,519 A | 7/1991 | Puffer et al. |
| 5,101,662 A | 4/1992 | Fisher |
| 5,129,602 A | 7/1992 | Leonard |
| 5,568,901 A | 10/1996 | Stiennon et al. |
| 5,667,167 A | 9/1997 | Kistler |
| 5,678,784 A | 10/1997 | Marshall, Jr. et al. |
| 5,765,361 A | 6/1998 | Jones et al. |
| 5,806,725 A | 9/1998 | Bennett |
| 5,927,653 A | 7/1999 | Mueller et al. |
| 6,039,325 A | 3/2000 | Steinetz et al. |
| 6,402,091 B1 | 6/2002 | Hansen |
| 6,457,306 B1 | 10/2002 | Abel et al. |
| 6,513,760 B1 | 2/2003 | Mueller et al. |
| 6,668,543 B2 | 12/2003 | Linner |
| 6,945,498 B2 | 9/2005 | Mueller et al. |
| 7,000,402 B2 | 2/2006 | Benians |
| 7,389,636 B2 | 6/2008 | Fowler et al. |
| 8,047,472 B1 | 11/2011 | Brand et al. |
| 9,217,389 B1 | 12/2015 | Lee |
| 2002/0059955 A1 * | 5/2002 | LaFleur ................. F16K 17/02 137/528 |
| 2004/0150165 A1 | 8/2004 | Grondahl |
| 2006/0049316 A1 | 3/2006 | Antonenko et al. |
| 2007/0012820 A1 | 1/2007 | Buehler |
| 2009/0302252 A1 | 12/2009 | Cheung |
| 2010/0326045 A1 | 12/2010 | Lal |
| 2011/0302905 A1 | 12/2011 | Weinberg |
| 2016/0076391 A1 | 3/2016 | Guinn |
| 2018/0119830 A1 | 5/2018 | Graham |
| 2019/0249869 A1 | 8/2019 | Glover |

FOREIGN PATENT DOCUMENTS

| | | |
|---|---|---|
| EP | 1340316 A1 | 9/2003 |
| EP | 2308636 B1 | 5/2012 |

OTHER PUBLICATIONS

Aerospace America, "The 787 and the A350 Teasing out the Facts," Publication of the American Institute of Aeronautics and Astronautics, Jun. 2009, 3 pages.

Hulka et al., Modification and Verification Testing of a Russian NK-33 Rocket Engine for Reusable and Restartable Applications, AIAA 98-3361, 1998, 26 pages.

* cited by examiner ically, check
FLUID DAMPED CHECK VALVE, AND ASSOCIATED SYSTEMS AND METHODS

TECHNICAL FIELD

The present technology relates generally to check valves and associated systems and methods and, more particularly, to check valves having a fluid damping chamber configured to damp acceleration of a poppet in oscillatory and/or high-pressure transient environments.

BACKGROUND

A check valve allows a fluid, such as gas, liquid, or gas/liquid mixture, to flow in one direction while preventing backflow. Check valves come in various forms, including ball-, swing-, and poppet-check designs. Typically, check valves are biased to a closed position by a rearward pressure ("cracking pressure") from a spring or hinge, and are flow sensitive so as to open when an upstream pressure from the fluid exceeds the rearward pressure of the spring or valve.

Under certain flow conditions, the forward and rearward pressures can interact to cause the valve to rapidly open and close ("chatter"). Such chatter can damage the check valve by, for example, prematurely wearing the internal components of the valve, such as the spring, poppet, valve seat, etc. Similarly, conventional check valves are susceptible to "surge" damage when high-pressure transient waves enter the check valve. Such high-pressure transients can accelerate internal components of the check valve (e.g., a poppet) to a high velocity before the components impact the housing of the check valve.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1:
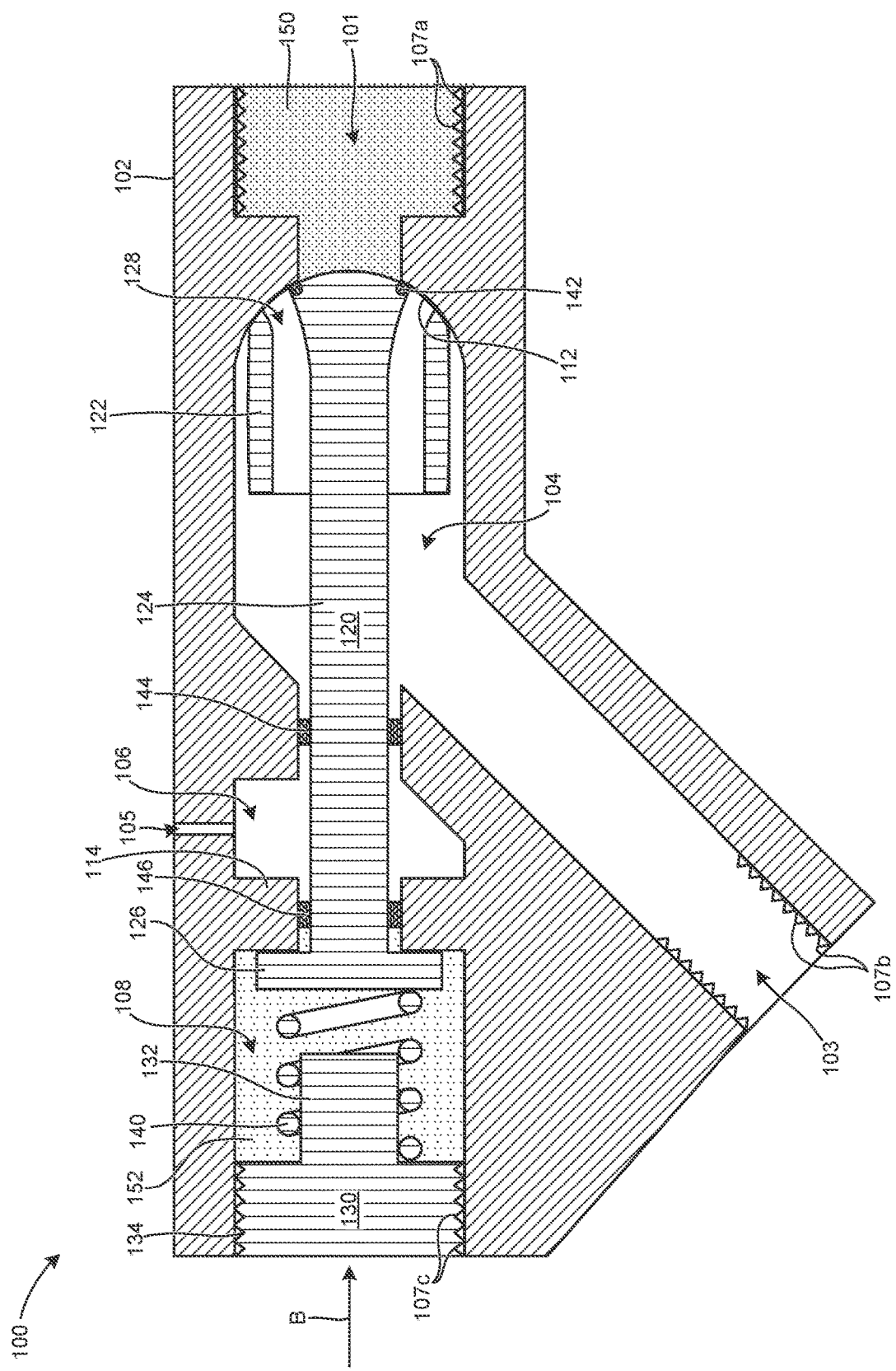
FIG. 1 is a side cross-sectional view of a representative check valve assembly in a closed position in accordance with embodiments of the present technology.

Aspects of the present disclosure are directed generally toward check valve assemblies for regulating the flow of an operating fluid, such as a liquid or gaseous fuel. In several of the embodiments described below, a representative check valve includes a housing and a piston assembly movably positioned within the housing. More specifically, the housing can include (i) an inlet port configured to receive a flow of the operating fluid, (ii) an outlet port, (iii) a flow chamber fluidly coupling the inlet port to the outlet port, and (iv) a damping chamber fluidly disconnected from the flow chamber. The damping chamber can contain a damping fluid, such as viscous and/or incompressible fluid. The piston assembly can include (i) a poppet positioned in the flow chamber, (ii) a flange positioned in the damping chamber, and (iii) a shaft extending between and coupling the poppet and the flange. In operation, the piston assembly is movable between a closed position and an open position. In the closed position, the poppet sealingly engages the housing to inhibit the operating fluid from flowing from the inlet port to the outlet port. In the open position, the poppet does not engage the housing and allows the operating fluid to flow from the inlet port to the outlet port. When the piston assembly moves between the open and closed positions, the flange moves through the damping fluid in the damping chamber. The damping fluid acts against the piston assembly to damp/slow the movement of the poppet.

In one aspect of the present technology, the check valve assembly can damp movement of the piston assembly even when the pressure of the operating fluid at the inlet port rapidly oscillates/fluctuates. This can inhibit or even prevent the check valve assembly from rapidly opening and closing ("chattering"), thereby reducing the wear on the housing, the poppet, and/or other internal components of the check valve assembly. In contrast, conventional check valves are susceptible to chatter when the inlet pressure rapidly fluctuates.

In another aspect of the present technology, the check valve assembly can damp movement of the piston assembly even when the pressure of the operating fluid at the inlet port surges (e.g., when a high-pressure transient wave enters the check valve assembly). This can inhibit or even prevent the piston assembly from forcefully impacting internal components of the check valve assembly in a manner that may damage these components. In contrast, a high-pressure transient wave will accelerate the poppet of a conventional check valve to a high velocity before the poppet impacts the back of the check valve housing.

In some embodiments, the housing of the check valve assembly can further include a leak chamber positioned between the flow chamber and the damping chamber. A first sealing member can be configured (e.g., positioned) to inhibit the operating fluid from flowing from the flow chamber into the leak chamber, and a second sealing member can be configured to inhibit the damping fluid from flowing from the damping chamber into the leak chamber. For example, the first and second sealing members can be positioned between the shaft of the piston assembly and the housing. In one aspect of the present technology, the leak chamber inhibits the damping fluid and the operating fluid from contaminating one another. In some embodiments, the leak chamber can include an outlet channel configured to expel any of the damping fluid and/or operating fluid that may leak past the first and second sealing members and into the leak chamber.

Certain details are set forth in the following description and in FIGS. 1-6 to provide a thorough understanding of various embodiments of the present technology. In other instances, well-known structures, materials, operations, and/or systems often associated with check valves, fluid control devices, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the spirit or scope of the present technology. In addition, those of ordinary skill in the art will appreciate that further embodiments of the present technology can be practiced without several of the details described below.

Figure 2:
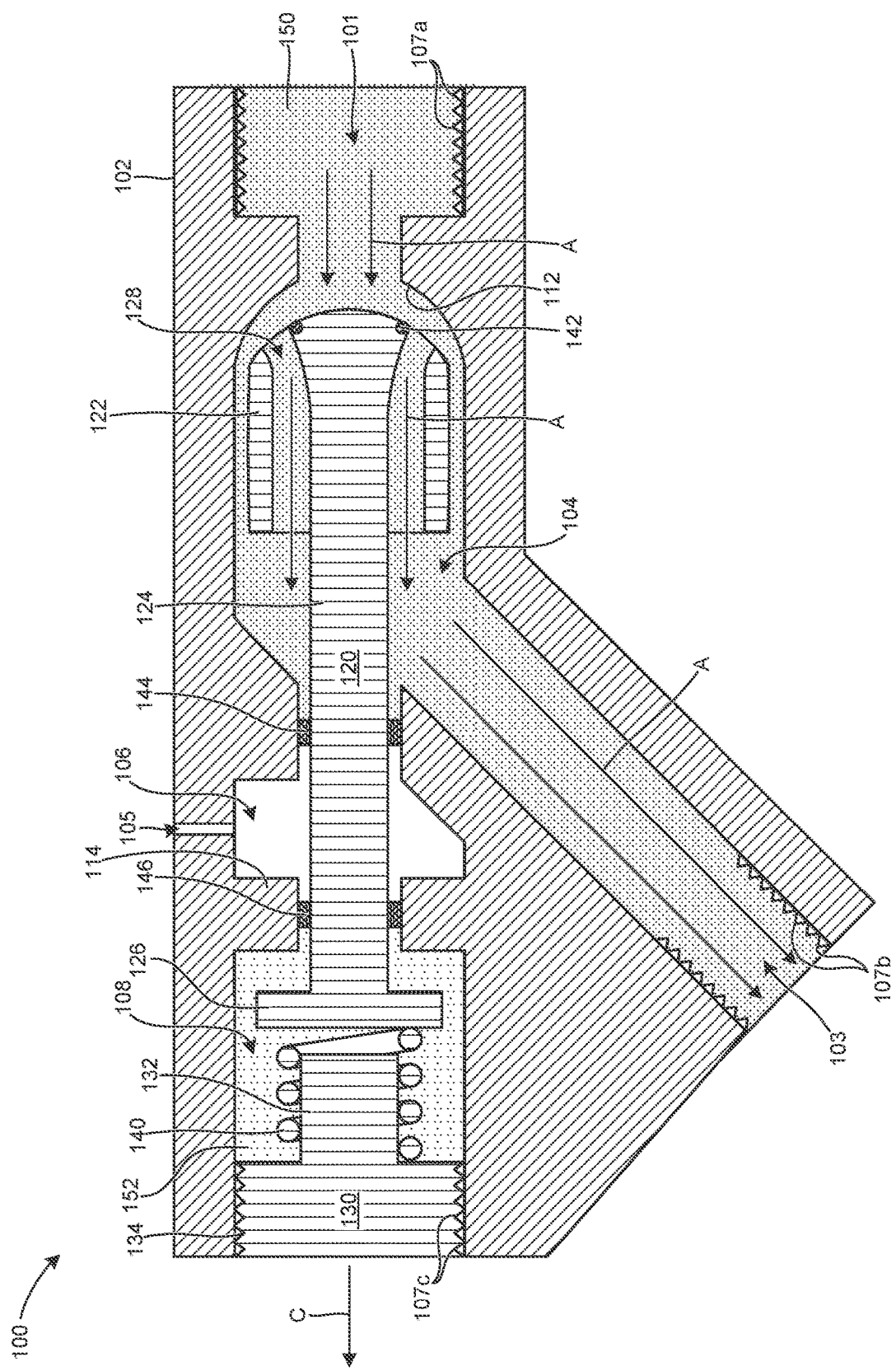
FIG. 2 is a side cross-sectional view of the check valve assembly of FIG. 1 in a partially-open position in accordance with embodiments of the present technology.
Figure 3:
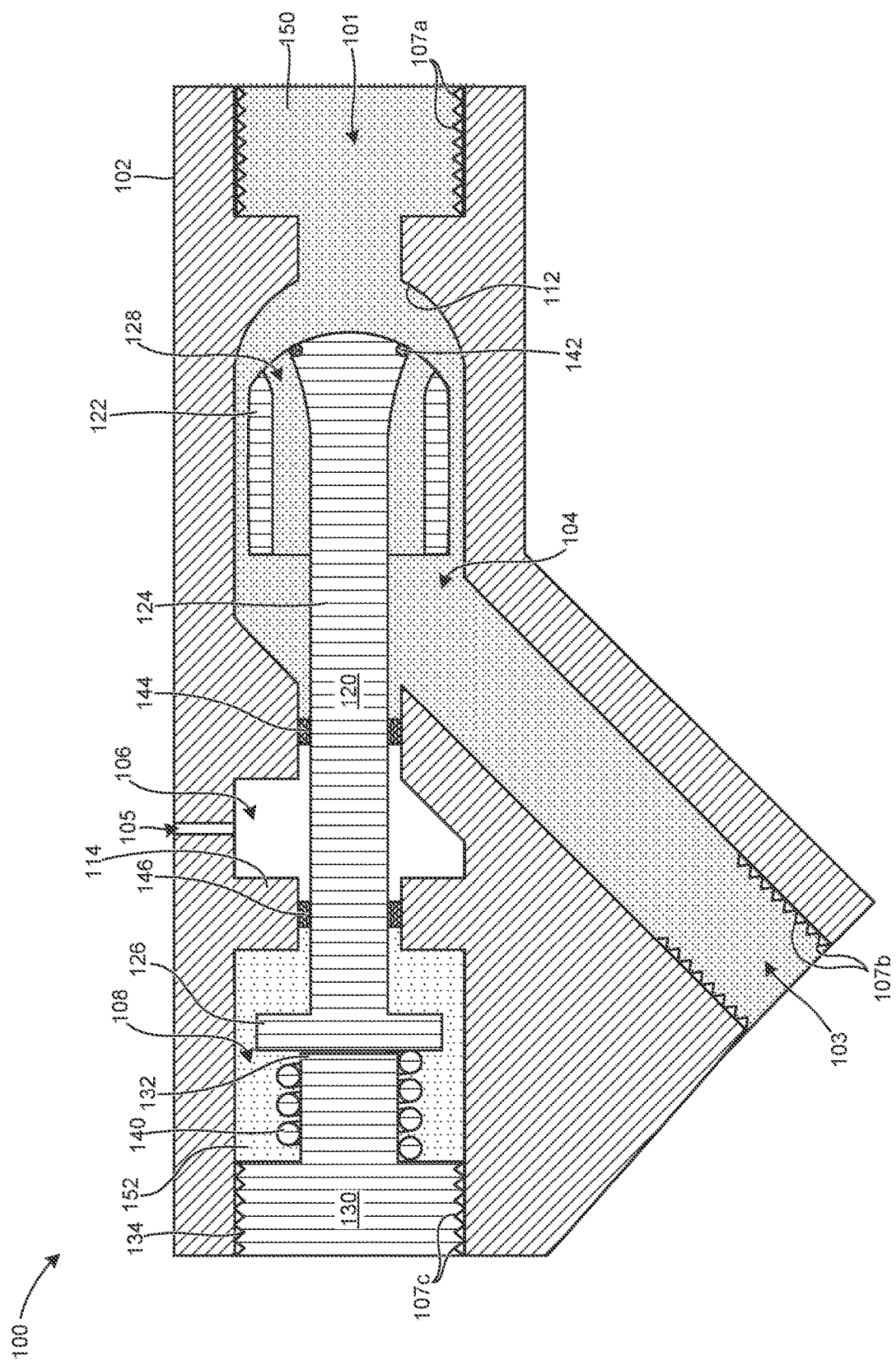
FIG. 3 is a side cross-sectional view of the check valve assembly of FIG. 1 in a fully-open position in accordance with embodiments of the present technology.

FIGS. 1-3 are side cross-sectional views of a check valve assembly 100 configured in accordance with embodiments of the present technology. The check valve assembly 100 is in a closed position/configuration in FIG. 1, a partially-open position/configuration in FIG. 2, and a fully-open position/configuration in FIG. 3. Referring to FIGS. 1-3 together, the check valve assembly 100 includes a housing 102, a piston assembly 120 movably positioned within the housing 102, a cap 130 secured (e.g., releasably secured) to the housing 102, and a biasing member 140 operably coupled between the piston assembly 120 and the cap 130.

In the illustrated embodiment, the housing 102 defines/includes (i) an inlet port 101 configured to receive a flow of an operating fluid 150, (ii) an outlet port 103, (iii) a flow chamber 104 (e.g., a first fluid chamber), (iv) a leak chamber 106 (e.g., a second fluid chamber), and (v) a damping chamber 108 (e.g., a third fluid chamber). The flow chamber 104 fluidly couples the inlet port 101 to the outlet port 103 and, when the check valve assembly 100 is in the partially-open and the fully-open positions shown in FIGS. 2 and 3, routes the operating fluid 150 from the inlet port 101 to the outlet port 103 (e.g., in the direction indicated by the arrows A in FIG. 2). In some embodiments, the operating fluid 150 can be a liquid or gaseous fuel, while in other embodiments, the operating fluid 150 can be water and/or any other liquid, gas, or mixture thereof.

With continued reference to FIGS. 1-3, the housing 102 further includes an outlet channel 105 (e.g., a bleed channel) fluidly coupling the leak chamber 106 to the environment outside the check valve assembly 100. In other embodiments, the outlet channel 105 can connect the leak chamber 106 to another chamber in the housing 102, and/or another fluid-control device. In some embodiments, the inlet port 101, the outlet port 103, and the damping chamber 108 can include threads 107 (identified individually as first threads 107a, second threads 107b, and third threads 107c, respectively) or other suitable mating features (e.g., grooves, slots, locking channels, etc.) for receiving and securing external components, such as fluid lines, pipes, etc. For example, in the illustrated embodiment the cap 130 is secured to the housing 102 via the third threads 107c.

The piston assembly 120 can include a poppet 122, a flange 126, and a shaft 124 extending between and coupling the poppet 122 and the flange 126. The poppet 122 is movably positioned within the flow chamber 104 and includes a first sealing member 142. The first sealing member 142 can be an O-ring, machined seal, and/or another suitable element. In some embodiments, the poppet 122 can include a flow channel 128 extending therethrough. The flow channel 128 can have a generally circular, oval, polygonal, or other cross-sectional shape. In other embodiments, the flow channel 128 can be omitted, or the poppet 122 can include a plurality of separate flow channels. The flange 126 is movably positioned within the damping chamber 108 and can have a cross-sectional dimension (e.g., diameter) that is greater than a corresponding cross-sectional dimension of the shaft 124. The shaft 124 extends at least partially through the flow chamber 104 and the leak chamber 106 and, in some embodiments, can extend at least partially into the damping chamber 108. In some embodiments, the poppet 122, the shaft 124, and/or the flange 126 can be integrally formed together while, in other embodiments, the poppet 122, the shaft 124, and/or the flange 126 can be separate components that are permanently or releasably coupled together.

In the illustrated embodiment, the biasing member 140 is coupled between the flange 126 and the cap 130 and is configured to bias the piston assembly 120 toward a valve seat 112 of the housing 102 (e.g., in the direction indicated by the arrow B in FIG. 1). The biasing member 140 can be or include a spring, such as a compression spring. In some embodiments, the cap 130 is releasably secured to the housing 102 via a threaded connection or other mating connection between an outer surface 134 of the cap 130 and the third threads 107c. In other embodiments, the cap 130 can be permanently secured to the housing 102 via welding, adhesives, etc., or the cap 130 can be an integral portion of the housing 102. In the illustrated embodiment, the cap 130 includes a stop portion 132 that is positioned at least partially within the biasing member 140 (e.g., within a channel/lumen of the biasing member 140). That is, the biasing member 140 can be coupled to the cap 130 at least partially around the stop portion 132. As shown in FIG. 3, the flange 126 of the piston assembly 120 can abut/engage the stop portion 132 in the fully-open position to inhibit or even prevent further compression of the biasing member 140.

The various components of the check valve assembly 100 can be formed from metal, plastic, composite materials, and/or other suitably strong materials. Similarly, the components of the check valve assembly 100 can be manufactured via a molding process, three-dimensional printing process, and/or another suitable manufacturing process.

In the illustrated embodiment, a damping fluid 152 at least partially fills the damping chamber 108. In some embodiments, the damping fluid 152 is an incompressible and/or viscous fluid. For example, the damping fluid 152 can be a hydraulic fluid, an oil or lubricant (e.g., of the type sold under the trademark KRYTOX by The Chemours Company), a refrigerant, and/or another suitable fluid. In the illustrated embodiment, a second sealing member 144 is (i) positioned between the shaft 124 of the piston assembly 120 and the housing 102 and (ii) configured to seal (e.g., fluidly disconnect) the flow chamber 104 from the leak chamber 106. Accordingly, the second sealing member 144 can inhibit or even prevent the operating fluid 150 from flowing from the flow chamber 104 into the leak chamber 106.

Similarly, a third sealing member 146 is (i) positioned between the shaft 124 of the piston assembly 120 and the housing 102 and (ii) configured to seal the damping chamber 108 from the leak chamber 106. Accordingly, the third sealing member 146 can inhibit or even prevent the damping fluid 152 from flowing from the damping chamber 108 into the leak chamber 106. The second and third sealing members 144, 146 can be O-rings, machined seals, etc., and can be identical or different (e.g., having different sizes, materials, etc.). The second and third sealing members 144, 146 can further be configured to remain in a fixed position relative to the housing 102 and maintain a fluidic seal even as the shaft 124 moves (e.g., slides) thereby/therethrough. Accordingly, during normal operation of the check valve assembly 100, the leak chamber 106 does not receive a liquid therein and can, for example, contain/receive air at ambient pressure via the outlet channel 105.

In one aspect of the present technology, the leak chamber 106 is configured to inhibit or even prevent the operating fluid 150 and the damping fluid 152 from contaminating one another. For example, any of the operating fluid 150 that leaks past the second sealing member 144 will be discharged through the outlet channel 105 and/or blocked by the third sealing member 146 before entering the damping chamber 108 and contaminating the damping fluid 152 therein. Likewise, any of the damping fluid 152 that leaks past the third sealing member 146 will be discharged through the outlet channel 105 and/or blocked by the second sealing member 144 before entering the flow chamber 104 and contaminating the operating fluid 150 therein. In another aspect of the present, this configuration advantageously allows the damping fluid 152 to be selected regardless of the operating fluid 150. For example, the damping fluid 152 can be selected to be significantly less compressible and/or more viscous than the operating fluid 150 to facilitate damping of the piston assembly 120.

Referring to FIG. 1, when the check valve assembly 100 is in the closed position, the biasing member 140 biases the piston assembly 120 toward the valve seat 112 of the housing 102 and the inlet port 101 such that the first sealing member 142 and/or another portion of the poppet 122 sealingly engages the valve seat 112 to inhibit or even prevent the operating fluid 150 from flowing into the flow chamber 104. Accordingly, the piston assembly 120 fluidly disconnects the inlet port 101 from the outlet port 103 in the closed position. In some embodiments, the flange 126 of the piston assembly 120 can abut a portion of the housing 102 (e.g., a wall portion 114 of the housing 102) in the closed position.

Referring to FIG. 2, when the force/pressure of the operating fluid 150 at the inlet port 101 exceeds a predetermined force/pressure (e.g., a "cracking pressure"), the operating fluid 150 forces the piston assembly 120 to move counter to the biasing force of the biasing member 140 (e.g., in the direction indicated by arrow C in FIG. 2) such that the poppet 122 disengages the valve seat 112 of the housing 102 to permit the operating fluid 150 to flow through the flow chamber 104 from the inlet port 101 to the outlet port 103. Accordingly, the piston assembly 120 does not sealingly engage the valve seat 112 in the partially-open position, and the inlet port 101 is fluidly connected to the outlet port 103. In the illustrated embodiment, the operating fluid 150 flows (i) through the flow channel 128 in the poppet 122 and (ii) through an annular space in the flow chamber 104 between the housing 102 and an outer surface of the poppet 122. In other embodiments, the poppet 122 can be configured differently to change the flow paths of the operating fluid 150. For example, the poppet 122 can be sized to generally match a dimension (e.g., circumference) of the flow chamber 104 to inhibit flow around the poppet 122 between the poppet 122 and the housing 102. Likewise, the flow channel 128 can be omitted such that the only flow path is around the poppet 122. In some embodiments, the biasing member 140 can be selected to provide a predetermined cracking pressure. For example, a spring constant of the biasing member 140 can be selected/tuned to provide a higher or lower cracking pressure.

Referring to FIG. 3, if the force/pressure of the operating fluid 150 exceeds another predetermined force/pressure, the operating fluid 150 can drive the flange 126 of the piston assembly 120 into engagement with the stop portion 132 of the cap 130 to inhibit further compression of the biasing member 140. Accordingly, in the fully-open position, the stop portion 132 prevents the poppet 122 from moving farther from the valve seat 112 of the housing 102 in the direction indicated by the arrow C in FIG. 2. In the illustrated embodiment, the flange 126 abuts the stop portion 132 before the biasing member 140 is fully compressed (e.g., reaches a solid-height position in which adjacent coils of the biasing member 140 contact one another). In one aspect of the present technology, the stop portion 132 can inhibit excessive compression of the biasing member 140 that could damage the biasing member 140.

Referring again to FIGS. 1-3 together, moving the piston assembly 120 between the closed, partially-open, and/or fully-open positions drives the flange 126 through/against the damping fluid 152 in the damping chamber 108. The force of the damping fluid 152 against the flange 126 acts counter to the acceleration of the piston assembly 120 to damp/slow the piston assembly 120. For example, as the piston assembly 120 moves from the closed position to the partially- or fully-open position, the force of the damping fluid 152 against the flange 126 acts counter to the force of the operating fluid 150 on the piston assembly 120 to slow the acceleration of the piston assembly 120 in the direction indicated by the arrow C in FIG. 2. Similarly, as the piston assembly 120 moves from the partially- or fully-open position to the closed position, the force of the damping fluid 152 against the flange 126 acts counter to the force of the biasing member 140 on the piston assembly 120 to slow the acceleration of the piston assembly 120 in the direction indicated by the arrow B in FIG. 1. In some embodiments, a dimension (e.g., area) of the flange 126 can be selected to provide a target amount of damping. For example, the flange 126 can be made relatively larger to provide a greater amount of damping.

In one aspect of the present technology, the check valve assembly 100 can damp movement of the piston assembly 120 even when the pressure of the operating fluid 150 at the inlet port 101 rapidly oscillates/fluctuates. This can inhibit or even prevent the check valve assembly 100 from rapidly opening and closing ("chattering"), thereby reducing the wear on the housing 102 (e.g., the valve seat 112), the poppet 122, and/or other internal components of the check valve assembly 100. In contrast, conventional check valves are susceptible to chatter when the inlet pressure rapidly fluctuates.

In another aspect of the present technology, the check valve assembly 100 can damp movement of the piston assembly 120 even when the pressure of the operating fluid 150 at the inlet port 101 surges (e.g., when a high-pressure transient wave enters the check valve assembly 100). This can inhibit or even prevent the piston assembly 120 from forcefully impacting the cap 130, the housing 102, and/or other internal components of the check valve assembly 100 in a manner that may damage these components. In contrast, a high-pressure transient wave will accelerate the poppet of a conventional check valve to a high velocity before the poppet impacts the back of the check valve housing.

Figure 4:
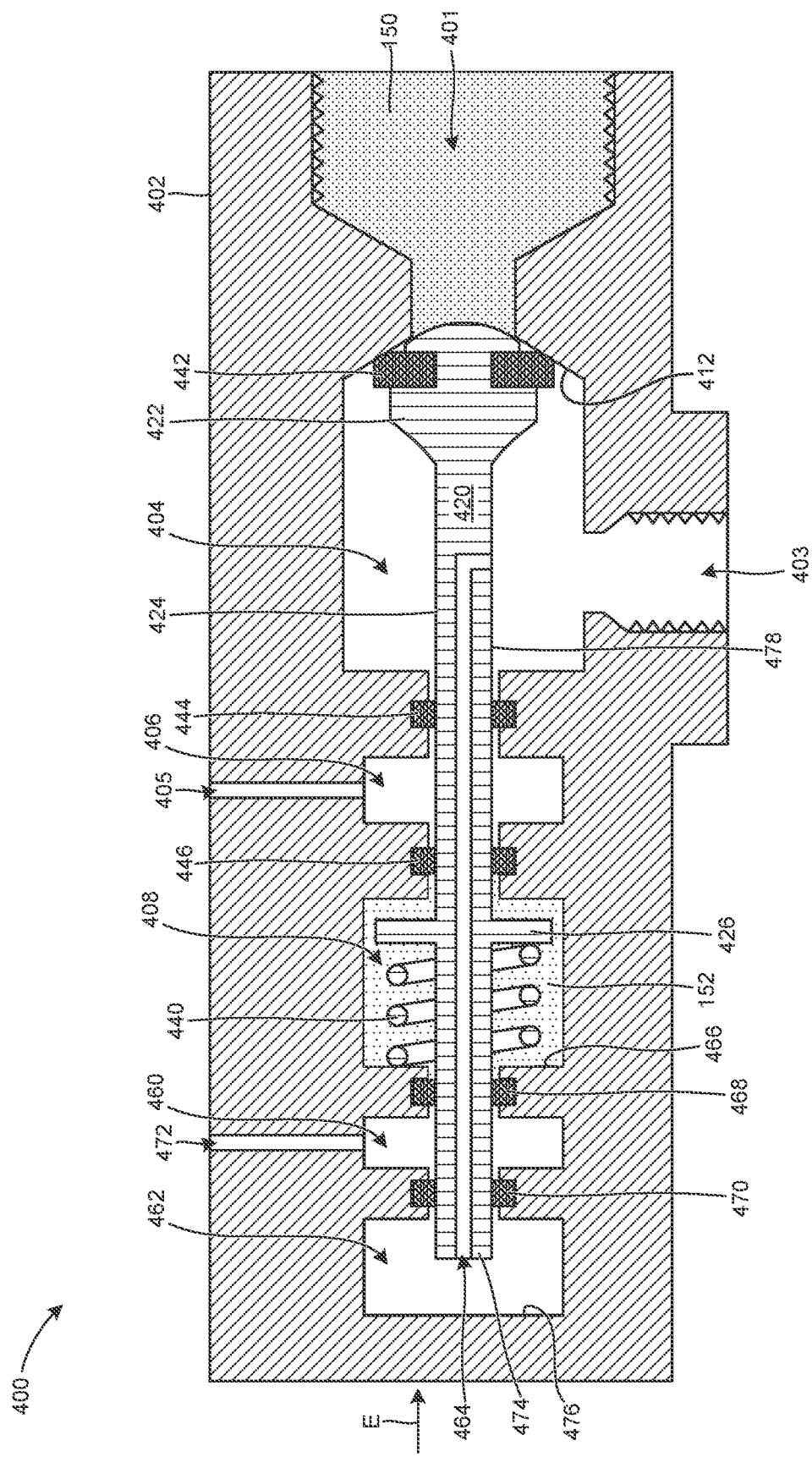
FIG. 4 is a side cross-sectional view of a representative check valve assembly in a closed position in accordance with additional embodiments of the present technology.
Figure 5:
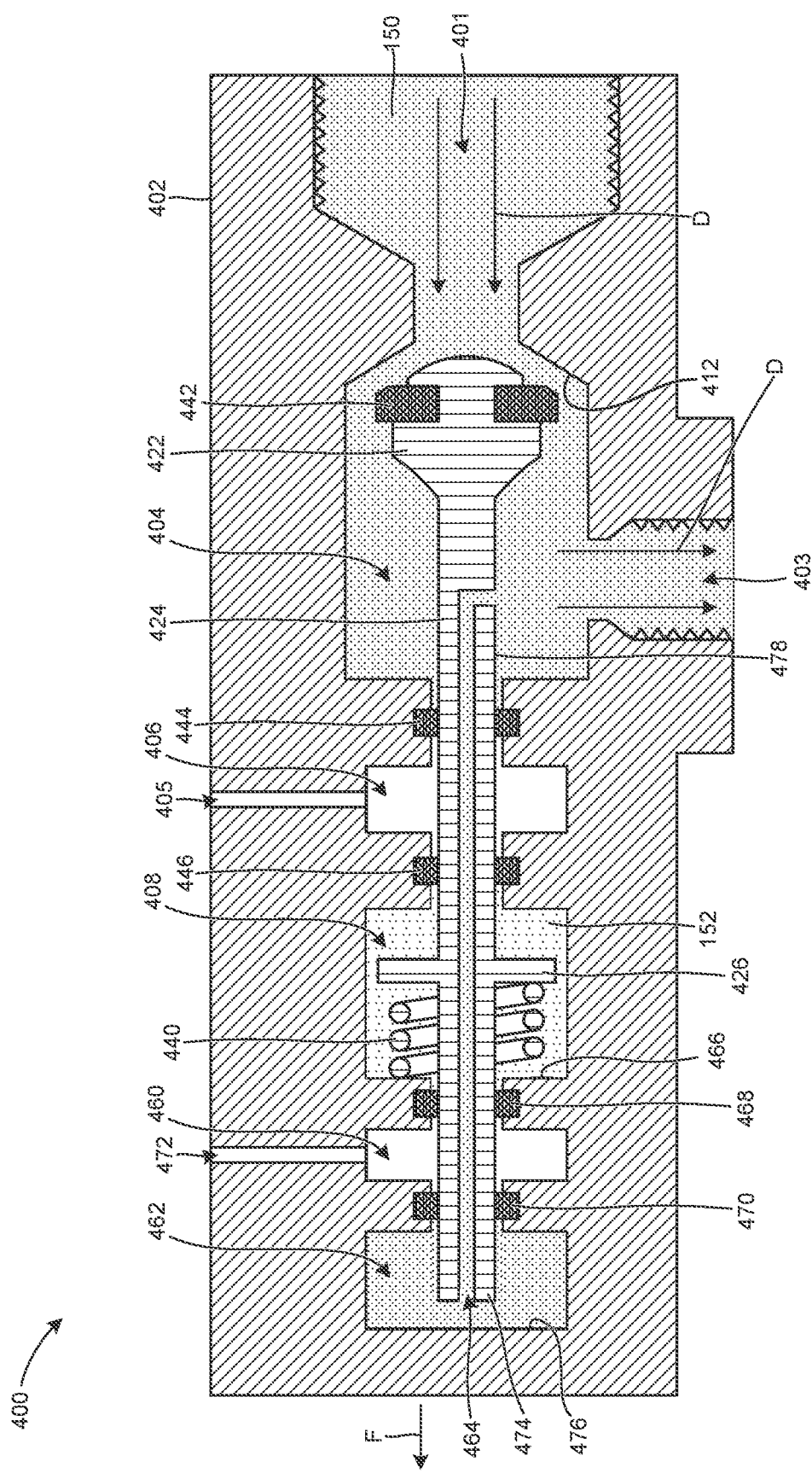
FIG. 5 is a side cross-sectional view of the check valve assembly of FIG. 4 in an open position in accordance with embodiments of the present technology.
Figure 6:
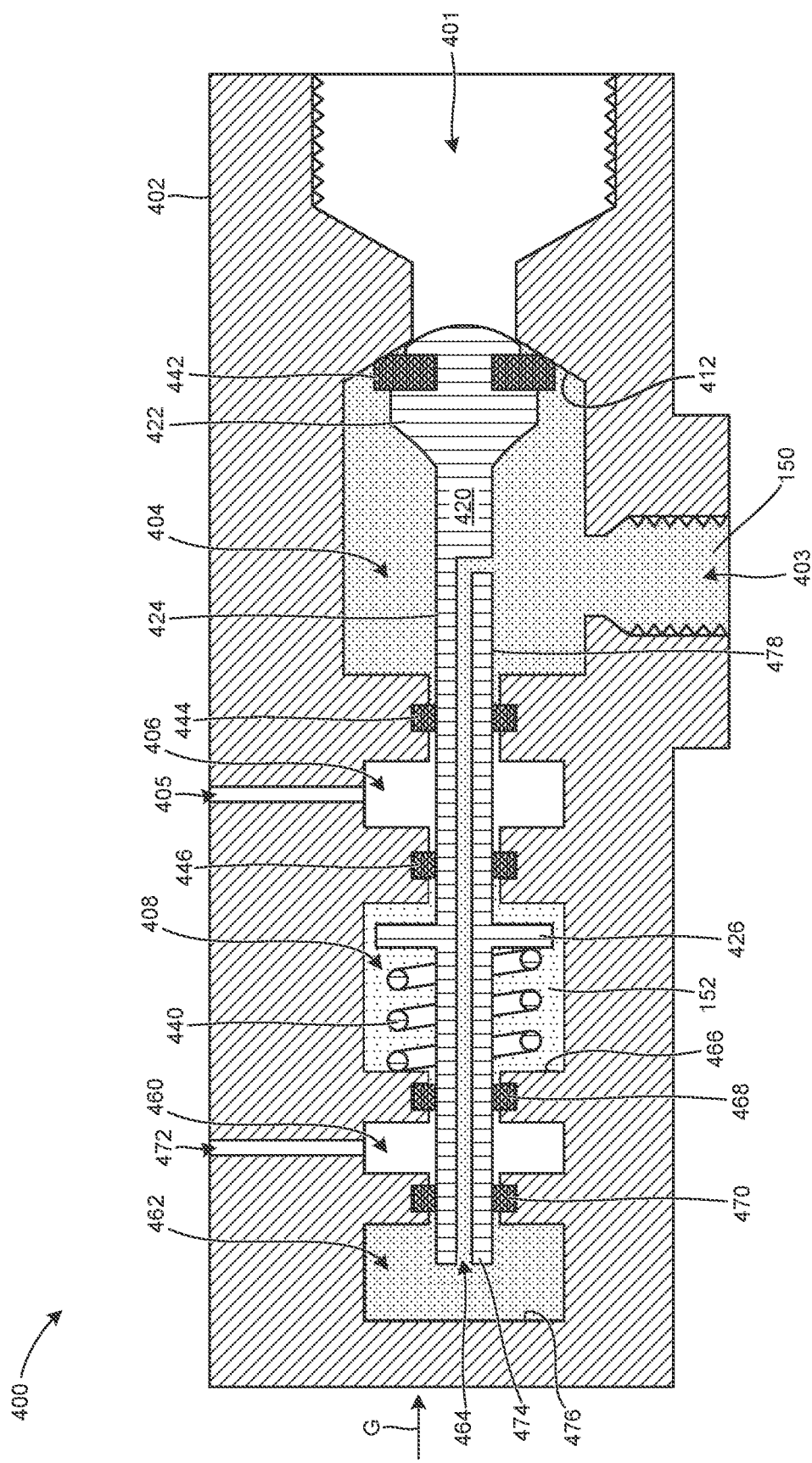
FIG. 6 is a side cross-sectional view of the check valve assembly of FIG. 4 during pressurized backflow in accordance with embodiments of the present technology.

FIGS. 4-6 are side cross-sectional views of a check valve assembly 400 configured in accordance with embodiments of the present technology. The check valve assembly 400 is in a closed position/configuration in FIG. 4, an open position/configuration in FIG. 5, and a closed position/configuration during pressurized backflow in FIG. 6. Referring to FIGS. 4-6 together, the check valve assembly 400 can include several features generally similar or identical to the features of the check valve assembly 100 described in detail above with reference to FIGS. 1-3. In the illustrated embodiment, for example, the check valve assembly 400 includes a housing 402, a piston assembly 420 movably positioned within the housing 402, and a biasing member 440 operably coupled between the piston assembly 420 and the housing 402. Likewise, the housing 402 defines and/or includes (i) an inlet port 401 configured to receive a flow of the operating fluid 150, (ii) an outlet port 403, (iii) a flow chamber 404 (e.g., a first fluid chamber), (iv) a first leak chamber 406 (e.g., a second fluid chamber), and (v) a damping chamber 408 (e.g., a third fluid chamber). The flow chamber 404 fluidly couples the inlet port 401 to the outlet port 403 and, when the check valve assembly 400 is in the open position shown in FIG. 5, routes the operating fluid 150 from the inlet port 401 to the outlet port 403 (e.g., in the direction indicated by the arrows D in FIG. 5).

In the illustrated embodiment, the housing 402 further defines/includes a second leak chamber 460 (e.g., a fourth fluid chamber) and a pressure equalization chamber 462 (e.g., a fifth fluid chamber). The first leak chamber 406 is positioned between (e.g., fluidly coupled between) the flow chamber 404 and the damping chamber 408, and the second leak chamber 460 is positioned between the damping chamber 408 and the pressure equalization chamber 462.

The piston assembly 420 can include a poppet 422, a flange 426, and a shaft 424 coupling (e.g., spanning between) the poppet 422 and the flange 426. The poppet 422 is movably positioned within the flow chamber 404 and includes a first sealing member 442. The flange 426 is movably positioned within the damping chamber 408 and can have a cross-sectional dimension (e.g., diameter) that is greater than a corresponding cross-sectional dimension of the shaft 424. The shaft 424 (i) extends at least partially through the flow chamber 404, the first leak chamber 406, the damping chamber 408, the second leak chamber 460, and the pressure equalization chamber 462, and (ii) includes an end portion 474 positioned within the pressure equalization chamber 462. In the illustrated embodiment, the shaft 424 further includes a bore 464 extending at least partially therethrough and configured to fluidly couple the flow chamber 404 to and/or with the pressure equalization chamber 462. In some embodiments, the bore 464 can extend through the shaft 424 between the end portion 474 and a sidewall 478 of the shaft 424 positioned in the flow chamber 404.

In the illustrated embodiment, the biasing member 440 is coupled between the flange 426 and a wall portion 466 of the damping chamber 408 and is configured to bias the piston assembly 420 toward a valve seat 412 of the housing 402 (e.g., in the direction indicated by the arrow E in FIG. 4). The damping fluid 152 can at least partially fill the damping chamber 408 and can be configured to damp movement of the flange 426 therethrough.

In the illustrated embodiment, a second sealing member 444 is (i) positioned between the shaft 424 of the piston assembly 420 and the housing 402 and (ii) configured to seal (e.g., fluidly disconnect) the flow chamber 404 from the first leak chamber 406 to inhibit or even prevent the operating fluid 150 from flowing from the flow chamber 404 into the first leak chamber 406. Similarly, a third sealing member 446 is (i) positioned between the shaft 424 of the piston assembly 420 and the housing 402 and (ii) configured to seal the damping chamber 408 from the first leak chamber 406 to inhibit or even prevent the damping fluid 152 from flowing from the damping chamber 408 into the first leak chamber 406. In the illustrated embodiment, the check valve assembly 400 further includes a fourth sealing member 468 (i) positioned between the shaft 424 of the piston assembly 420 and the housing 402 and (ii) configured to seal the damping chamber 408 from the second leak chamber 460 to inhibit or even prevent the damping fluid 152 from flowing from the damping chamber 408 into the second leak chamber 460. Likewise, a fifth sealing member 470 is (i) positioned between the shaft 424 of the piston assembly 420 and the housing 402 and (ii) configured to seal the second leak chamber 460 from the pressure equalization chamber 462 to inhibit or even prevent the operating fluid 150 from flowing from the pressure equalization chamber 462 into the second leak chamber 460, as described in greater detail below. The second through fifth sealing members 444, 446, 468, 470 can be configured to maintain a fluidic seal even as the shaft 424 moves (e.g., slides) thereby and/or therethrough during operation of the check valve assembly 400. Accordingly, during normal operation of the check valve assembly 400, the first and second leak chambers 406, 460 do not receive a liquid therein and can, for example, contain/receive air at ambient pressure via a first outlet channel 405 and a second outlet channel 472, respectively.

Referring to FIG. 4, when the check valve assembly 400 is in the closed position, the biasing member 440 biases the piston assembly 420 toward the valve seat 412 of the housing 402 and the inlet port 401 such that the first sealing member 442 and/or another portion of the poppet 422 sealingly engages the valve seat 412 to inhibit or even prevent the operating fluid 150 from flowing into the flow chamber 404. Accordingly, the piston assembly 420 fluidly disconnects the inlet port 401 from the outlet port 403 in the closed position.

Referring to FIG. 5, when the force and/or pressure of the operating fluid 150 at the inlet port 401 exceeds a predetermined value (e.g., a "cracking pressure"), the operating fluid 150 forces the piston assembly 420 to move counter to the biasing force of the biasing member 440 (e.g., in the direction indicated by arrow F in FIG. 5) such that the poppet 422 disengages the valve seat 412 of the housing 402 to permit the operating fluid 150 to flow through the flow chamber 404 from the inlet port 401 to the outlet port 403. Accordingly, the piston assembly 420 does not sealingly engage the valve seat 412 in the open position, and the inlet port 401 is fluidly connected to the outlet port 403. In the illustrated embodiment, the operating fluid 150 flows through an annular space in the flow chamber 404 between the housing 402 and an outer surface of the poppet 422. In other embodiments, the poppet 422 can include one or more flow channels for receiving flow of the operating fluid 150. In some embodiments, if the force/pressure of the operating fluid 150 exceeds another predetermined force and/or pressure value, the operating fluid 150 can drive the shaft 424 (e.g., the end portion 474 of the shaft 424) into engagement with a wall portion 476 of the pressure equalization chamber 462 to inhibit further compression of the biasing member 440.

As further shown in FIG. 5, the operating fluid 150 can flow (i) into the bore 464 from the flow chamber 404, (ii) through the bore 464, and (iii) into the pressure equalization chamber 462. In one aspect of the present technology, the operating fluid 150 in the pressure equalization chamber 462 can ensure that the piston assembly 420 moves to the closed position shown in FIG. 4 (e.g., will check closed) when the pressure at the inlet port 401 decreases below the cracking pressure of the check valve assembly 400.

Referring to FIG. 6, in some embodiments the check valve assembly 400 can be installed into and/or onto a supply line of the operating fluid 150 that can experience pressurized backflow (e.g., pressurized flow in the direction of arrow G in FIG. 6). Under such conditions, embodiments of the present technology that do not include the pressure equalization chamber 462 and the bore 464 (e.g., in an embodiment of the check valve assembly 100 shown in FIGS. 1-3), the back pressure may be great enough to maintain the piston assembly 420 in the open position (FIG. 4). That is, for example, a pressure differential between the flow chamber 404 and the damping chamber 406 can be large enough to maintain the piston assembly 420 in the open position—overcoming the biasing force of the biasing member 440—and thereby allowing unwanted or undesirable back flow of the operating fluid 150 from the outlet port 403 through the flow chamber 404 to the inlet port 401. More specifically, the operating fluid 150 may be under high back pressure in the flow chamber 404 while the damping chamber 406 remains at a lower pressure.

However, in one aspect of the present technology, the pressure equalization chamber 462 and the bore 464 can act to reduce a pressure differential (e.g., equalize the pressure) in the check valve assembly 400 to permit the biasing member 440 to move the piston assembly 420 to the closed position. More specifically, the operating fluid 150 in the pressure equalization chamber 462 can reduce the net force acting against the piston assembly 420, thereby allowing the biasing member 440 to bias the piston assembly 420 against the valve seat 412 to inhibit fluid flow from the outlet port 403 through the flow chamber 404 to the inlet port 401.

In another aspect of the present technology, the first and second leak chambers 406, 460 are configured to inhibit or even prevent the operating fluid 150 and the damping fluid 152 from contaminating one another. For example, any of the operating fluid 150 that leaks past the second sealing member 444 or the fifth sealing member 470 will be discharged through the first outlet channel 405 or the second outlet channel 472, respectively, and/or blocked by the third sealing member 446 or the fourth sealing member 468, respectively, before entering the damping chamber 408 and contaminating the damping fluid 152 therein. Likewise, any of the damping fluid 152 that leaks past the third sealing member 446 or the fourth sealing member 468 will be discharged through the first outlet channel 405 or the second outlet channel 472, respectively, and/or blocked by the second sealing member 444 or the fifth sealing member 470, respectively, before entering the flow chamber 404 and contaminating the operating fluid 150 therein.

In another aspect of the present technology, the check valve assembly 400 can damp movement of the piston assembly 420 even when the pressure of the operating fluid 150 at the inlet port 401 rapidly oscillates or surges. This can inhibit or even prevent the check valve assembly 400 from chattering and/or being rapidly accelerated into the housing 402, thereby reducing the wear on the internal components of the check valve assembly 400.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, other embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A check valve assembly, comprising:
    a housing including—
        an inlet port;
        an outlet port;
        a flow chamber fluidly coupling the inlet port to the outlet port;
        a damping chamber; and
        a leak chamber positioned between the flow chamber and the damping chamber, wherein the leak chamber is positioned to receive air at ambient pressure;
    a piston assembly extending at least partially through the flow chamber to the damping chamber, wherein the piston assembly is movable between a closed position and an open position, and wherein the piston assembly is positioned to sealing engage the housing in the closed position to fluidly disconnect the inlet port from the outlet port;
    a biasing member operably coupled to the piston assembly, wherein the biasing member is configured to bias the piston assembly to the closed position; and
    at least one sealing member between the piston assembly and the housing, wherein the at least one sealing member is positioned to fluidly disconnect the flow chamber from the damping chamber.

2. A check valve assembly, comprising:
    a housing including—
        an inlet port;
        an outlet port;

a flow chamber fluidly coupling the inlet port to the outlet port;

a damping chamber;

a leak chamber positioned between the flow chamber and the damping chamber;

an outlet channel fluidly connected to the leak chamber, wherein the outlet channel is positioned to pass fluid flow from the leak chamber to outside the housing;

a piston assembly extending at least partially through the flow chamber to the damping chamber, wherein the piston assembly is movable between a closed position and an open position, and wherein the piston assembly is positioned to sealingly engage the housing in the closed position to fluidly disconnect the inlet port from the outlet port;

a biasing member operably coupled to the piston assembly, wherein the biasing member is configured to bias the piston assembly to the closed position; and at least one sealing member between the piston assembly and the housing, wherein the at least one sealing member is positioned to fluidly disconnect the flow chamber from the damping chamber.

3. The check valve assembly of claim 2 wherein the piston assembly includes a flange, wherein the housing includes a wall at least partially defining the damping chamber, and wherein the biasing member extends between the flange and the wall within the damping chamber.

4. The check valve assembly of claim 2 wherein the inlet port is configured to receive a flow of an operating fluid, and wherein the piston assembly is configured to move from the closed position to the open position when a pressure of the operating fluid at the inlet port exceeds a threshold value to permit the operating fluid to flow from the inlet port to the outlet port.

5. The check valve assembly of claim 2 wherein the at least one sealing member includes (a) a first sealing member positioned between the piston assembly and the housing to fluidly disconnect the flow chamber from the leak chamber and (b) a second sealing member positioned between the piston assembly and the housing to fluidly disconnect the damping chamber from the leak chamber.

6. The check valve assembly of claim 2, further comprising a damping fluid positioned in the damping chamber.

7. The check valve assembly of claim 6 wherein the damping fluid is selected from the group consisting of a hydraulic fluid, an oil, and a refrigerant.

8. The check valve assembly of claim 2 wherein the damping chamber is positioned to receive a damping liquid.

9. A check valve assembly, comprising:

a housing including—
an inlet part;
an outlet port;
a flow chamber fluidly coupling the inlet port to the outlet port;
a damping chamber;
a pressure equalization chamber;
a first leak chamber positioned between the flow chamber and the damping chamber; and
a second leak chamber positioned between the damping chamber and the pressure equalization chamber; and piston assembly extending at least partially through the flow chamber, the damping chamber, and the pressure equalization chamber, wherein the piston assembly is movable between a closed position and an open position, wherein the piston assembly is positioned to sealingly engage the housing in the closed position to fluidly disconnect the inlet port from the outlet port, and wherein the piston assembly includes a bore extending between and fluidly coupling the flow chamber with the pressure equalization chamber.

10. The check valve assembly of claim 9 wherein the inlet port is configured to receive a flow of an operating fluid, and wherein the piston assembly is configured to move from the closed position to the open position when a pressure of the operating fluid at the inlet port exceeds a threshold value to permit the operating fluid to flow from the inlet port to the outlet port.

11. The check valve assembly of claim 10 wherein the bore is positioned to receive a flow of the operating fluid when the when the piston assembly is in the open position.

12. The check valve assembly of claim 9, further comprising a biasing member positioned in the damping chamber, wherein the biasing member is operably coupled to the piston assembly to bias the piston assembly to the closed position.

13. The check valve assembly of claim 9 wherein the first leak chamber and the second leak chamber are each positioned to receive air at ambient pressure.

14. The check valve assembly of claim 9, further comprising:

a first sealing member positioned between the piston assembly and the housing to fluidly disconnect the flow chamber from the first leak chamber;

a second sealing member positioned between the piston assembly and the housing to fluidly disconnect the damping chamber from the first leak chamber;

a third sealing member positioned between the piston assembly and the housing to fluidly disconnect the damping chamber from the second leak chamber; and a fourth sealing member positioned between the piston assembly and the housing to fluidly disconnect the pressure equalization chamber from the second leak chamber.

15. The check valve assembly of claim 9 wherein the bore fluidly couples the flow chamber with the pressure equalization chamber when the piston assembly is in the open position.

16. A check valve assembly, comprising:

a housing including—
an inlet port configured to receive a flow of an operating fluid;
an outlet port;
a flow chamber fluidly coupling the inlet port to the outlet port;
a damping chamber positioned to receive a damping fluid, wherein the damping fluid is less compressible than the operating fluid; and
a pressure equalization chamber; and piston assembly extending at least partially through the flow chamber, the damping chamber, and the pressure equalization chamber, wherein the piston assembly is configured to move from a closed position to an open position when a pressure of the operating fluid at the inlet port exceeds a threshold value to permit the operating fluid to flow from the inlet port to the outlet port, wherein the piston assembly is positioned to sealingly engage the housing in the closed position to fluidly disconnect the inlet port from the outlet port, and wherein the piston assembly includes a bore extending between and fluidly coupling the flow chamber with the pressure equalization chamber.

17. The check valve assembly of claim 16 wherein the pressure equalization chamber is farther from the flow chamber than the damping chamber.

18. A check valve assembly, comprising:
a housing including—
   an inlet port;
   an outlet port;
   a flow chamber fluidly coupling the inlet port to the outlet port;
   a damping chamber; and
   a leak chamber fluidly coupled between the flow chamber and the damping chamber;
a piston assembly movably positioned within the housing,
   wherein the piston assembly is movable between a closed position and an open position,
   wherein, in the closed position, the piston assembly seals the flow chamber to fluidly disconnect the inlet port from the outlet port, and
   wherein, in the open position, the inlet port is fluidly connected to the outlet port;
   a first sealing member positioned to at least partially fluidly disconnect the flow chamber from the leak chamber; and
   a second sealing member positioned to fluidly disconnect the damping chamber from the leak chamber.

19. The check valve assembly of claim 18 wherein the inlet port is configured to receive a flow of an operating fluid, and wherein the piston assembly is configured to move from the closed position to the open position when a pressure of the operating fluid at the inlet port exceeds a threshold value to permit the operating fluid to flow from the inlet port to the outlet port.

20. The check valve assembly of claim 18 wherein the housing further includes an outlet channel fluidly connected to the leak chamber, wherein the leak chamber is positioned to receive air at ambient pressure through the outlet channel, and wherein the outlet channel is positioned to pass fluid flow from the leak chamber to outside the housing.

* * * * *

UNITED STATES PATENT AND TRADEMARK OFFICE
CERTIFICATE OF CORRECTION

PATENT NO. : 11,703,145 B1
APPLICATION NO. : 17/516335
DATED : July 18, 2023
INVENTOR(S) : Justin K. Bahrami et al.

Page 1 of 1

It is certified that error appears in the above-identified patent and that said Letters Patent is hereby corrected as shown below:

On the Title Page

On the page 2, in Column 2, under Item (56) "U.S. Patent Documents", Line 23, delete "Lal" and insert -- Lai --.

In the Claims

In Column 10, Line 54, in Claim 1, delete "sealing" and insert -- sealingly --.

In Column 11, Line 51, in Claim 9, delete "part;" and insert -- port; --.

In Column 12, Line 13, in Claim 11, delete "when the when the" and insert -- when the --.

Signed and Sealed this
Tenth Day of October, 2023

Katherine Kelly Vidal
*Director of the United States Patent and Trademark Office*